United States Patent [19]

Gruber

[11] Patent Number: 4,921,296
[45] Date of Patent: May 1, 1990

[54] GLARE SCREEN DEVICE FOR VEHICLE SIDE DOOR EXTERIOR MIRROR

[75] Inventor: Carl A. Gruber, 1968 Axtell, Troy, Mich. 48084

[73] Assignee: Carl A. Gruber, Troy, Mich.

[21] Appl. No.: 332,582

[22] Filed: Apr. 3, 1989

Related U.S. Application Data

[63] Continuation-in-part of Ser. No. 181,500, Apr. 14, 1988, abandoned.

[51] Int. Cl.$^5$ ................................................. B60J 3/00
[52] U.S. Cl. .................................... 296/97.2; 296/97.9
[58] Field of Search ................ 296/97.1, 97.2, 97.7, 296/97.9

[56] References Cited

U.S. PATENT DOCUMENTS

| | | |
|---|---|---|
| 1,180,589 | 4/1916 | Kubet . |
| 1,454,498 | 5/1923 | Whall et al. . |
| 1,492,748 | 5/1924 | Reimer ................................ 296/97.9 |
| 1,920,185 | 8/1933 | Carr, Jr. . |
| 1,953,877 | 4/1934 | Chase . |
| 2,261,301 | 11/1941 | Smith . |
| 2,594,813 | 4/1952 | Seibert . |
| 2,665,166 | 1/1954 | Roark . |
| 2,715,043 | 8/1955 | Schewel ............................ 296/97.7 |
| 2,962,721 | 12/1960 | Espy .................................. 296/97.7 |
| 3,022,109 | 2/1962 | Hauskama ........................ 296/97.7 |
| 3,025,098 | 3/1962 | Andrews . |
| 3,410,602 | 11/1968 | Schuler . |
| 3,412,506 | 11/1968 | Shiota . |
| 3,415,569 | 12/1968 | Leevo . |
| 3,454,301 | 7/1969 | Lehmann . |
| 3,518,427 | 6/1970 | Cotterill . |
| 3,948,554 | 4/1976 | Barbee . |
| 4,023,856 | 5/1977 | DeRees . |
| 4,130,317 | 12/1978 | Lai . |
| 4,560,251 | 12/1985 | Murjahn . |

*Primary Examiner*—Sherman D. Basinger
*Assistant Examiner*—Stephen P. Avila
*Attorney, Agent, or Firm*—Brooks & Kushman

[57] ABSTRACT

A vehicle side door mirror glare screen device (34) is disclosed as including a lower mount (36) having a lower tapered end (38) that is inserted between the door window and the door and as also having an upper end that projects upwardly with an inner surface that mounts a glare screen (46) of a sheet-like construction having a sufficient size and shape to screen light glare from an associated exterior door mirror. The lower end (38) of the lower mount (36) preferably has a taper (54) that facilitates its insertion and also preferably has a generally pointed construction (56). Glare screen (46) also preferably has inclined edges (58) that facilitate its positioning and has a horizontally elongated shape that is preferably oblong. A transparent tinted plastic is preferably utilized to fabricate the glare screen (46). In one embodiment, a bonded connection (68) secures the upper end (40) of the lower mount (36) to the glare screen (46) when a two-piece construction is utilized, and, in another embodiment, the lower mount (36) and glare screen (46) are injection molded with an integral, one-piece construction. The lower mount (36) is preferably provided with surface texturing (70) that holds the glare screen device in position.

13 Claims, 3 Drawing Sheets

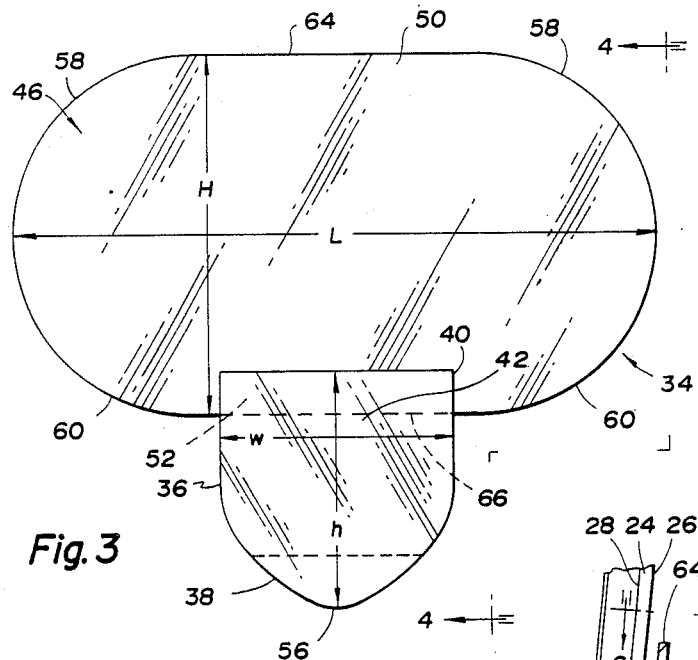
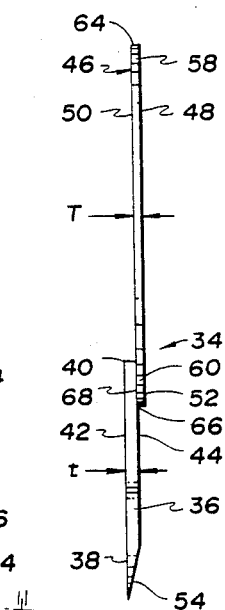
Fig. 3
Fig. 4
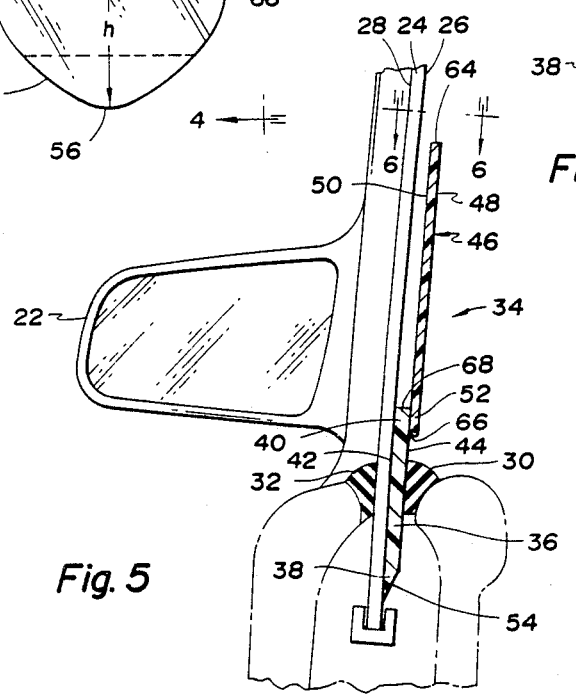
Fig. 5
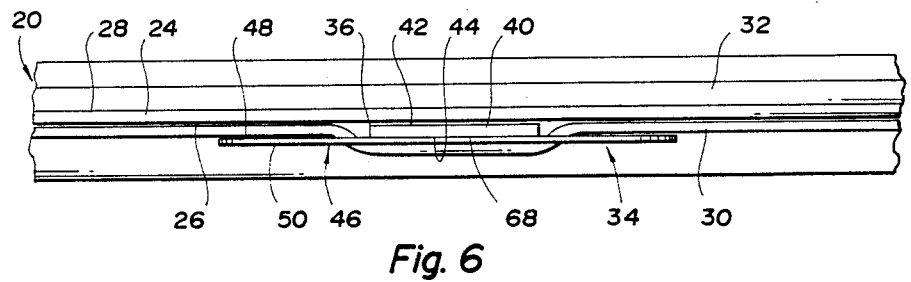
Fig. 6

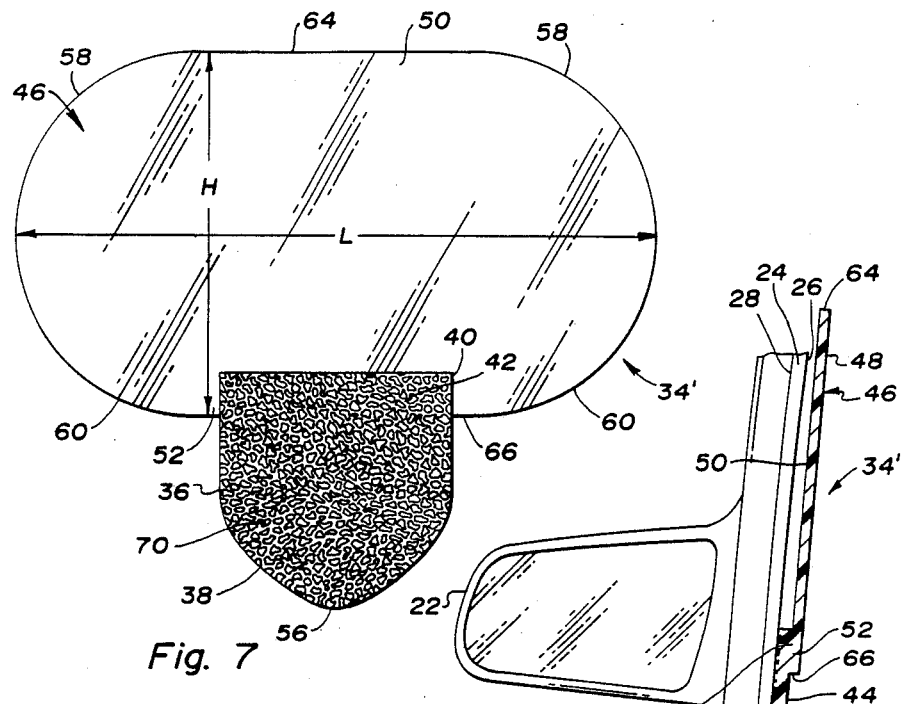
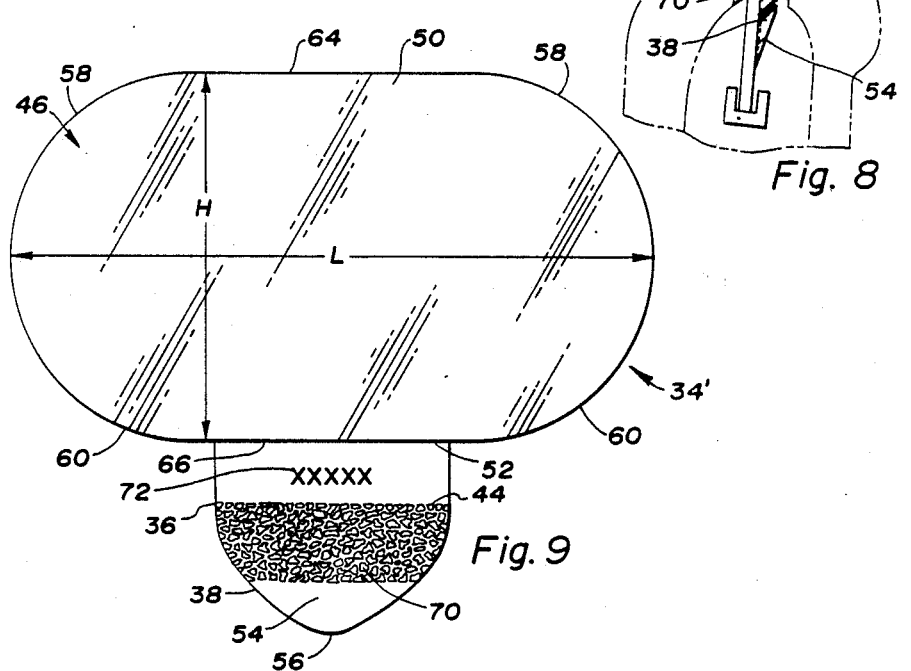

GLARE SCREEN DEVICE FOR VEHICLE SIDE DOOR EXTERIOR MIRROR

CROSS REFERENCE TO RELATED APPLICATION

This application is a continuation-in-part of prior application Ser. No. 181,500 filed on Apr. 14, 1988, now abandoned by Carl A. Gruber under the title Glare Screen Device for Vehicle Side Door Exterior Mirror.

TECHNICAL FIELD

This invention relates to a glare screen device for screening a vehicle occupant from headlight glare reflected from a vehicle side door exterior rear view mirror.

BACKGROUND ART

Conventional vehicle interior rear view mirrors include a reflection control adjuster for nighttime use to prevent headlight glare from shining directly into the vehicle driver's eyes.

Current production vehicles include vehicle side doors having exterior rear view mirrors on both the driver and passenger sides in order to cooperate with the interior rear view mirror in providing a better view of the area directly to the rear of the vehicle and to each lateral side to the rear. As such, there is an additional light glare problem from these exterior rear view mirrors on the vehicle side doors in addition to the light glare involved with the interior rear view mirror. In an attempt to overcome this problem, the U.S. Pat. No. 4,560,251 of Murjahn discloses an antiglare shield for exterior mirrors wherein an antiglare shield of transparent plastic that is preferably tinted is engaged directly with the inner surface of the side door window. A stop provided by a molding on the inner surface of the antiglare sheet engages the upper edge of the door to position the antiglare shield in a fixed location. As such, this antiglare shield does not lend itself for adjustable positioning with the different geometries and door designs of the many vehicles now being manufactured.

Other vehicles window glare shields and screens are disclosed by U.S. patents: 1,180,589 Kubat; 1,454,498 Whall et al.; 1,920,185 Carr, Jr.; 1,953,877 Chase; 2,261,301 Smith; 2,594,813 Seibert; 2,665,166 Roark; 3,025,098 Andrews; 3,410,602 Schüler; 3,412,506 Masayoshi Shiota; 3,415,569 Leevo; 3,454,301 Lehmann; 3,518,427 Cotterill; 3,948,554 Barbee; 4,023,856 DeRees; and 4,130,317 Lai.

DISCLOSURE OF INVENTION

An object of the present invention is to provide an improved glare screen device for use with a vehicle side door having an exterior mirror. In carrying out this object, the glare screen device is constructed so as to be usable with the various types of vehicle side door designs presently being produced as well as permitting raising and lowering of the vehicle window with the glare screen device in place. Also, the glare screen device is easily adjustable and has a construction that facilitates its positioning on either the driver or passenger vehicle side door for use.

The glare screen device of the invention is designed for use with a vehicle side door having an exterior rear view mirror, a vertically movable window having inner and outer surfaces, and an inboard upper end of the door preferably provided by an inner seal located adjacent the inner surface of the window.

A lower mount of the glare screen has a lower tapered end that is insertable between the inner surface of the window and the inboard upper end of the door provided by the inner seal. An upper end of the lower mount projects upwardly from the inboard upper end of the door provided by the seal. The lower mount has an outer surface that faces the inner surface of the door window and has an inner surface that faces and is engaged by the inner seal that defines the inboard upper end of the door.

A glare screen of the device has a generally sheet-like construction with inner and outer surfaces and a lower portion where the outer surface thereof is connected to the inner surface of the lower mount such that the glare screen is spaced inwardly from the inner surface of the door. The glare screen has a sufficient size and shape to screen a vehicle occupant adjacent the door from light glare from the exterior rear view mirror of the door.

The spaced relationship of the glare screen from the vehicle side door window by virtue of its connection to the inner surface of the lower mount permits adjustment of the positioning of the glare screen device as well as raising and lowering of the window with the glare screen device mounted in position between the inner surface of the window and the inboard upper end of the door provided by the inner seal.

In its preferred construction, the glare screen device has its lower mount provided with a sheet-like construction. The tapered lower end of the lower mount also preferably has a generally pointed construction that further facilitates its insertion between the inner surface of the window and the inner seal of the inboard upper end of the door.

In its preferred construction, the glare screen device also has the glare screen provided with a horizontally elongated shape that lends itself to effective screening of rear view mirrors without unnecessary size. The glare screen most preferably has upper inclined edges for facilitating positioning of the glare screen device without interference with the conventionally rearwardly inclined vehicle windshield pillar or any associated vehicle side door window frame. These inclined edges are preferably provided at both ends of the device so as to facilitate its use at both the driver and passenger side doors and are most preferably of a curved construction that is best provided by a horizontally extending oblong shape of the glare screen.

The glare screen device is disclosed as being manufactured with the lower mount and glare screen fabricated as separate components and by then incorporating a bonded connection for securing the upper end of the lower mount to the lower portion of the glare screen. This bonded connection can be provided by an adhesive bond or by a solvent bond when plastic is utilized to fabricate both the lower mount and the glare screen. The glare screen device can also be injection molded such that the lower mount and glare screen are integral with each other.

In one embodiment disclosed, the lower mount has a sheet-like construction with texturing on at least one of its surfaces to provide friction that prevents movement of the glare screen device. Preferably, the lower mount has this texturing provided on both its inner and outer surfaces. Furthermore, as disclosed, the texturing on the inner surface of the lower mount terminates below the lower portion of the glare screen in a spaced relationship thereto to provide room for indicia therebetween, such as advertising, so the glare screen can be utilized as a promotional product.

The preferred construction of the glare screen device has the glare screen made of a transparent plastic that is tinted to reduce the transmission of light.

The objects, features, and advantages of the present invention are readily apparent from the following detailed description of the best modes for carrying out the invention when taken in connection with the accompanying drawings.

BRIEF DESCRIPTION OF DRAWINGS

FIG. 3 is a side view of the glare screen device looking in an inboard direction;

FIG. 4 is an end view of the glare screen device taken along the direction of line 4—4 in FIG. 3;

FIG. 5 is a sectional view taken through the glare screen device and an associated vehicle door on which it is illustrated as being mounted;

FIG. 6 is a top plan view taken along the direction of line 6—6 in FIG. 5 and illustrates the mounted relationship of the glare screen device on the side door;

FIG. 7 is a side view of an alternate embodiment of the glare screen device looking in the same inboard direction as FIG. 3 to illustrate texturing on an outer surface of a lower mount of the glare screen device;

FIG. 8 is a sectional view similar to FIG. 5 for illustrating how the texturing of the lower mount prevents movement of the glare screen in its mounted relationship on the vehicle side door; and FIG. 9 is a view of the alternate embodiment of the glare screen taken in the opposite direction as FIG. 7 to illustrate texturing on the inner surface of the lower mount.

BEST MODES FOR CARRYING OUT THE INVENTION

Figure 1:
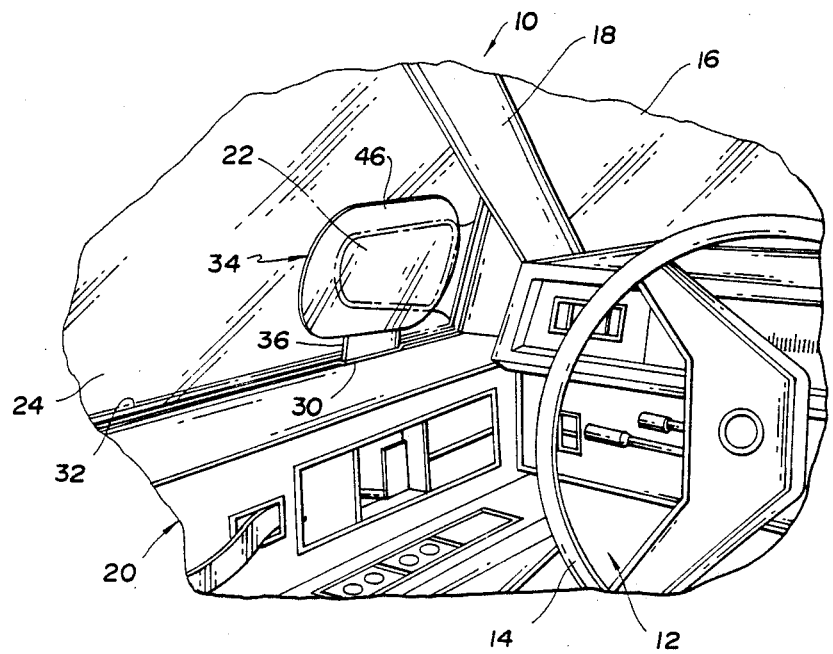
FIG. 1 is a partial perspective view of a vehicle interior adjacent the driver side door and illustrates one embodiment of a glare screen device constructed according to the invention for use in screening glare from an exterior rear view mirror of the driver door.

With reference to FIG. 1 of the drawings, a vehicle generally indicated by 10 has a portion of its occupant compartment 12 illustrated adjacent the driver side where the steering wheel 14 is located to the rear of the windshield 16 whose lateral side is bounded by the rearwardly inclined windshield pillar 18 in a conventional manner. A side door 20 of the vehicle is illustrated as having an exterior rear view mirror 22 that is located adjacent the lower end of the windshield pillar 18 in a conventional manner. Side door 20 also has a vertically movable window 24 with inner and outer surfaces 26 and 28 as shown in FIG. 5. The vehicle door window 24 is movable up and down between open and closed positions by an unshown window regulator which may be of either the manual or power operated type. The door 20 is illustrated in both FIG. 5 and 6 as having inner and outer seals 30 and 32 that are designed to seal with the inner and outer door window surfaces 26 and 28. As best shown in FIG. 5, the inner seal 30 defines an inboard upper end of the door at an elevation that is located just below the exterior rear view mirror 22 mounted on the door in a conventional manner.

Figure 2:
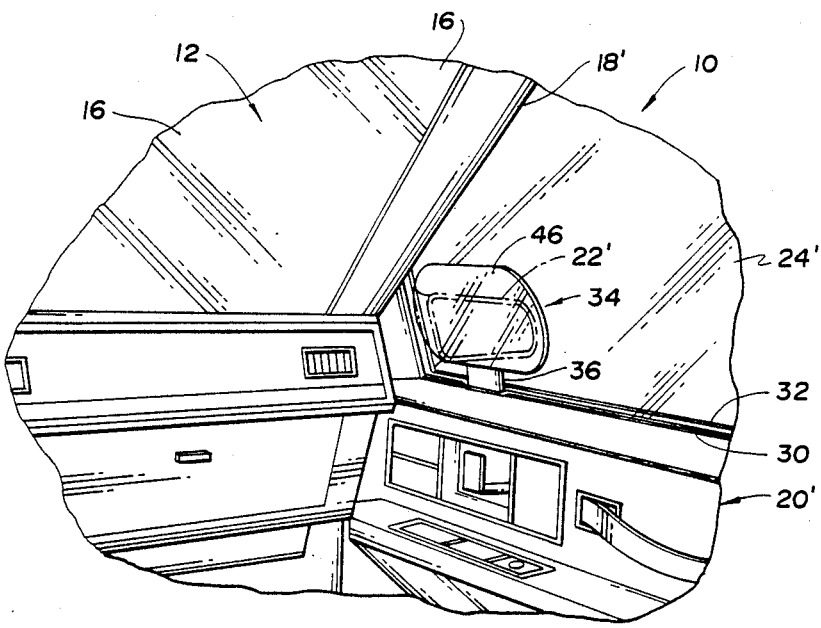
FIG. 2 is a partial perspective view of a vehicle interior adjacent the passenger side door and illustrates the glare screen device for use in screening an exterior rear view mirror of the passenger door.

As illustrated in FIG. 1, one embodiment of a glare screen device according to the present invention is indicated by 34 and is illustrated as being mounted on the vehicle side door 20 in a manner which is hereinafter more fully described. Also, as illustrated in FIG. 2, the glare screen device 34 can be mounted on the passenger side door 20' on the inside of its passenger door window 24' just to the rear of the passenger side windshield pillar 18' to provide glare screening of the passenger door exterior rear view mirror 22'.

As illustrated by FIGS. 3 through 6, the glare screen device 34 includes a lower mount 36 having a lower tapered end 38 that is insertable between the inner surface 26 of the window 24 and the inboard upper door end provided by the inner seal 30. The lower mount 36 also has an upper end 40 that projects upwardly from the inner seal 30 at the upper inboard end of the door. An outer surface 42 of the lower mount 36 engages the inner window surface 26 as shown in FIG. 5 while an inner surface 44 of the lower mount faces the inboard upper end of the door and is engaged by the inner seal 30 to provide positioning for use.

A glare screen 46 of the device 34 has a generally sheet-like construction as shown by FIGS. 3 through 6 with inner and outer surfaces 48 and 50 that extend generally parallel to the window. A lower portion 52 of the glare screen 46 is connected to the inner surface 44 of the lower mount 36 at its upper end 40 such that the glare screen is spaced inwardly from the inner surface 26 of the window as shown in FIG. 5. As best illustrated in both FIGS. 1 and 2, the glare screen 46 has a sufficient size and shape to screen a vehicle occupant adjacent the door from light glare from the exterior rear view mirror 22 or 22'.

The construction of the glare screen device 34 permits ease of adjusting its position on the door for screening of the mirror with respect to any vehicle driver. Also, the spacing of the glare screen 46 from the window 24 permits upward and downward window adjustment if necessary with the glare screen device 34 mounted in position as shown in both FIGS. 1 and 2.

In its preferred construction, the glare screen device has its lower mount 36 provided with a sheet-like construction whose lower end 38 has its taper identified by 54. Specifically, the taper 54 extends from the inner surface 44 of the lower mount 36 in a downward direction toward the outer surface 42 located adjacent the inner surface 26 of the side door window 24. This tapered construction of the lower end 38 of the lower mount 36 facilitates its insertion between the inner surface 26 of the window 24 and the inner seal 30 that provides the inboard upper end of the door as shown in FIG. 5.

As illustrated in FIG. 3, the glare screen device also has the tapered lower end 38 of its lower mount 36 provided with a generally pointed construction 56 that further facilitates its insertion between the inner surface of the window and the inner upper end of the door provided by the inner seal. This pointed construction 56 of the lower end 38 of lower mount 3 preferably starts above the taper from each side of the lower mount.

As best illustrated in FIG. 3, the glare screen device 34 has its glare screen 46 provided with a horizontally elongated shape which provides effective screening of the associated door mirror with minimal size. More specifically, the glare screen 46 preferably has upper inclined edges 58 that facilitate forward positioning of the glare screen device without interference with the associated door window frame or windshield pillar regardless of whether the device is utilized at the driver or passenger side of the vehicle as respectively illustrated by FIGS. 1 and 2. These inclined upper edges 58 of the glare screen 46 illustrated in FIG. 3 are most preferably of a curve shape. Most preferably, the glare screen has a horizontally extending oblong shape with lower curved edges 60 that cooperate with the upper curved edges 58 to define semicircles that are connected by upper and lower straight edges 64 and 66.

As best shown in FIG. 3, the glare screen 46 has a length L which is preferably on the order of about eleven inches and also has a height H that is preferably on the order of about six inches such that the semicircles provided by the curved edges 58 and 60 each have a three inch radius. The lower mount 36 preferably has a width w that is approximately four inches as well as a height h of about four inches. Also, as shown in FIG. 3, the lower mount 36 has a thickness t of about 3/16 of an inch, while the glare screen 46 has a thickness T of about 1/16 of an inch.

As shown in FIG. 5, the glare screen device 34 is disclosed as including a bonded connection 68 for securing the upper end 40 of the lower mount 36 to the lower portion 52 of the glare screen 46. This bonded connection 68 can be provided by any suitable type of adhesive bonding or by a solvent bond when both the lower mount 36 and the glare screen 46 are made from plastic as discussed below. Also, as is hereinafter discussed, it is possible for the glare screen device 34 to be injection molded from plastic so as to have an integral construction rather than the two-piece construction shown with the bonded connection.

The glare screen device 34 preferably has its glare screen 46 made from a suitable transparent plastic that is tinted to reduce the transmission of light. Suitable plastics which may be utilized include polyester terephthalate glycol (PCTG), poly cyclohexylene terephthalate glycol (PCTG), polycarbonates, acrylics, polycarbonates, and polystyrenes which allow the light to be at least partially transmitted without distortion while still screening out glare that can adversely affect the vehicle driver or a front seat passenger. The lower mount 36 is also preferably made from a similar type of plastic which allows the bonded connection 68 to be made by a solvent bonding as well as an adhesive bonding if the two-piece construction is utilized instead of a one-piece injection molding.

As illustrated in FIGS. 7 through 9, an alternate embodiment of the glare screen device 34′ has the same construction as the previously described embodiment such that like reference numerals are applied to like components thereof and the previous description is applicable except as will be noted. Specifically, this alternate embodiment of the glare screen device 34′ has its lower mount 34 and upper glare screen 46 formed as a plastic injection molding unitary with each other such that there is a unitary connection between the upper end 40 of the lower mount 36 and the lower portion 52 of the glare screen 46 as best illustrated in FIG. 8.

As best illustrated in FIGS. 7 and 9, at least one of the surfaces 42 and 44 of the lower mount 36 is provided with texturing 70 that is preferably of a generally grainy or pebbly construction. This texturing 70 on the lower mount 36 is preferably provided on both its outer surface 42 and its inner surface 44. As illustrated in FIG. 7, the texturing 70 is provided on the entire extent of the outer surface 42 of the lower mount 36. As illustrated in FIG. 9, the texturing 70 on the inner surface 44 of the lower mount 36 terminates below the lower edge 66 of the lower portion 52 of the glare screen 46 in a spaced relationship thereto to provide room for indicia 72 therebetween such that advertising can be provided on the device so it can function as a promotional item. It should be noted that the texturing 70 does not extend onto the taper 54 so as to inhibit the insertion of the glare screen device into its mounted relationship illustrated in FIG. 8.

With the glare screen device 34′ mounted as illustrated in FIG. 8, the texturing 70 on the outer surface 42 engages the window 24 to provide a greater amount of friction for inhibiting movement. Likewise, the texturing 70 on the inner surface 44 of the lower mount 36 engages the inner seal 30 to also provide a greater amount of friction for inhibiting movement of the glare screen device 34′.

While the best modes for carrying out the invention have been described in detail, those familiar with the art to which this invention relates will recognize various alternative designs and embodiments for practicing the invention when defined by the following claims.

What is claimed is:

1. A glare screen device for use with a vehicle side door having an exterior rear view mirror, a vertically movable window having inner and outer surfaces, and an inboard upper end of the door located adjacent the inner surface of the window, the glare screen device comprising:
    a lower mount having a sheet-like construction and a lower tapered end that is insertable between the inner surface of the window and the inboard upper end of the door, the lower mount also having an upper end that projects upwardly from the inboard upper end of the door, the lower mount having an outer surface that faces the inner surface of the door window and having an inner surface that faces the inboard upper end of the door, and the lower mount having texturing on both its inner and outer surfaces; and
    a glare screen of a generally sheet-like construction having inner and outer surfaces and having a lower portion where the outer surface thereof is connected to the inner surface of the lower mount at the upper end thereof such that the glare screen is spaced inwardly from the inner surface of the window, and the glare screen having a sufficient size and shape to screen a vehicle occupant adjacent the door from light glare from the exterior rear view mirror of the door.

2. A vehicle door mirror glare screen device as in claim 1 wherein the lower mount has a sheet-like construction.

3. A vehicle door mirror glare screen device as in claim 2 wherein the tapered lower end of the lower mount has a generally pointed construction that further facilitates its insertion between the inner surface of the window and the inboard upper end of the door.

4. A vehicle door mirror glare screen device as in claim 1 wherein the glare screen has a horizontally elongated shape.

5. A vehicle door mirror glare screen device as in claim 4 wherein the glare screen has upper inclined edges for facilitating proper positioning of the glare screen device for use.

6. A vehicle door mirror glare screen device as in claim 5 wherein the upper inclined edges of the glare screen are curved.

7. A vehicle door mirror glare screen device as in claim 1 wherein the glare screen has a horizontally extending oblong shape.

8. A vehicle door mirror glare screen device as in claim 1 wherein the lower mount and glare screen are formed as a plastic injection molding unitary with each other.

9. A vehicle door mirror glare screen device as in claim 1 wherein the texturing on the inner surface of the lower mount terminates below the lower portion of the glare screen in a spaced relationship thereto to provide room for indicia therebetween.

10. A vehicle door mirror glare screen device as in any one of claims 1 through 7, 8 and 9 wherein the glare screen is made from transparent plastic that it tinted to reduce the transmission of light.

11. A glare screen device for use with a vehicle side door having an exterior rear view mirror, a vertically movable window having inner and outer surfaces, and an inboard upper end of the door having an inner seal located adjacent the inner surface of the window, the glare screen device comprising:

- a lower mount of a generally sheet-like construction having a lower tapered end that is insertable between the inner surface of the window and the inner seal, the lower mount also having an upper end that projects upwardly from the inner seal, the lower mount having an outer surface that faces the inner surface of the door window and having an inner surface engaged with the inner seal, and the lower mount having texturing on both its inner and outer surfaces; and
- a plastic glare screen of a generally sheet-like construction having inner and outer surfaces and having a lower portion where the outer surface thereof is connected to the inner surface of the lower mount at the upper end thereof such that the glare screen is spaced inwardly from the inner surface of the window, and the glare screen having a sufficient size and shape to screen a vehicle occupant adjacent the door from light glare from the exterior rear view mirror of the door.

12. A glare screen device for use with a vehicle sided door having an exterior rear view mirror, a vertically movable window having inner and outer surfaces, and na inboard upper end of the door having an inner seal located adjacent the inner surface of the window, the glare screen device comprising:

- a lower mount of a generally sheet-like construction having a lower tapered end that is insertable between the inner surface of the window and the inner seal, the lower mount also having an upper end that projects upwardly from the inner seal, the lower mount having an outer surface that faces the inner surface of the door window and having an inner surface engaged with the inner seal, and the lower mount having texturing on both its inner and outer surfaces; and
- a glare screen of a generally sheet-like construction made of transparent plastic that is tinted, the plastic glare screen having inner and outer surfaces and having a lower portion where the outer surface thereof has a bonded connection to the inner surface of the lower mount at the upper end thereof such that the glare screen is spaced inwardly from the inner surface of the window, and the glare screen having a sufficient size and shape to screen a vehicle occupant adjacent the door from light glare from the exterior rear view mirror of the door.

13. A glare screen device for use with a vehicle side door having an exterior rear view mirror, a vertically movable window having inner and outer surfaces, and an inboard upper end of the door having an inner seal located adjacent the inner surface of the window, the glare screen device comprising:

- a lower mount of a generally sheet-like construction having a lower tapered end of a generally pointed shape that is insertable between the inner surface of the window and the inner seal, the lower mount also having an upper end that projects upwardly from the inboard upper end of the door, the lower mount having an outer surface that engages the inner surface of the door window and having an inner surface engaged with the inner seal, and the lower mount having texturing on both its inner and outer surfaces; and
- a glare screen of a generally sheet-like construction having a horizontally extending oblong shape, the glare screen being made of transparent plastic that is tinted and having inner and outer surfaces, the glare screen having a lower portion where the outer surface thereof has a bonded connection to the inner surface of the lower mount at the upper end thereof such that the glare screen is spaced inwardly from the inner surface of the window, and the oblong shape of the glare screen having a sufficient size to screen a vehicle occupant adjacent the door from light glare from the exterior rear view mirror of the door.

* * * * *